US012664295B2

(12) United States Patent
Shaw et al.

(10) Patent No.: US 12,664,295 B2
(45) Date of Patent: Jun. 23, 2026

(54) TAMPER AND ZEROIZATION RESPONSE UNIT

(71) Applicant: Crystal Group, Inc., Hiawatha, IA (US)

(72) Inventors: James E Shaw, Ely, IA (US); Adrian A Hill, Cedar Rapids, IA (US); Michael A Steffen, Cedar Rapids, IA (US); Matt Seivert, Palo, IA (US); Alan High, Cedar Rapids, IA (US); William Byers, Marion, IA (US)

(73) Assignee: Crystal Group, Inc., Hiawatha, IA (US)

( * ) Notice: Subject to any disclaimer, the term of this patent is extended or adjusted under 35 U.S.C. 154(b) by 493 days.

(21) Appl. No.: 18/121,190

(22) Filed: Mar. 14, 2023

(65) Prior Publication Data
US 2023/0376619 A1 Nov. 23, 2023

Related U.S. Application Data

(60) Provisional application No. 63/319,399, filed on Mar. 14, 2022.

(51) Int. Cl.
*G06F 21/62* (2013.01)
*G06F 21/60* (2013.01)
(Continued)

(52) U.S. Cl.
CPC ........ *G06F 21/6218* (2013.01); *G06F 21/602* (2013.01); *G06F 21/81* (2013.01);
(Continued)

(58) Field of Classification Search
CPC .... G06F 21/6218; G06F 21/602; G06F 21/81; G06F 21/88; G06F 21/86; G06F 2221/2143
See application file for complete search history.

(56) References Cited

U.S. PATENT DOCUMENTS 8,159,259 B1 * 4/2012 Lewis ................. H03K 19/177
326/8
8,826,433 B2 * 9/2014 Kimelman ............. G06F 21/55
726/16
(Continued)

*Primary Examiner* — Cheng-Feng Huang
(74) *Attorney, Agent, or Firm* — Simmons Perrine PLC

(57) ABSTRACT

A device that encapsulates functions necessary to sanitize an electronic system after detecting tampering or when user zeroization occurs. The device includes a FPGA, sensors, external tamper sensors, a battery, interfaces or discrete signals required to execute sanitization of hard drives, flash, registers, etc. The device issues a sanitization response through interface commands Manual sanitization (zeroization) can be achieved two ways, locally or through a remote zeroize button/switch/discrete. The sanitization response is activated through monitoring the tamper sensors. The sanitization response will destroy stored data and encryption keys before they can be compromised. The sanitization response could produce a notification that an event has occurred. The system can provide data protection without main line or standby power. Sensors could include, chassis intrusion switches, motion detectors, radiation sensors, light sensors, temperature sensors, magnetic sensors, or other external inputs.

20 Claims, 4 Drawing Sheets

(51) Int. Cl.

| | | |
|---|---|---|
| *G06F 21/81* | (2013.01) | |
| *G06F 21/88* | (2013.01) | |
| *G06F 21/86* | (2013.01) | |

(52) U.S. Cl.
CPC .............. *G06F 21/88* (2013.01); *G06F 21/86* (2013.01); *G06F 2221/2143* (2013.01)

(56) References Cited

U.S. PATENT DOCUMENTS

| | | | |
|---|---|---|---|
| 2010/0283604 A1 | 11/2010 | Sakai | |
| 2011/0043339 A1 | 2/2011 | McGregor | |
| 2011/0231932 A1* | 9/2011 | Kimelman | G06F 21/55 |
| | | | 726/23 |
| 2012/0286760 A1 | 11/2012 | Carapelli et al. | |
| 2013/0034230 A1* | 2/2013 | Takahashi | H04M 1/67 |
| | | | 380/270 |
| 2013/0111227 A1 | 5/2013 | Sauerwein, Jr. | |
| 2013/0300453 A1 | 11/2013 | Carapelli et al. | |
| 2015/0130636 A1 | 5/2015 | Bowling et al. | |
| 2016/0042617 A1 | 2/2016 | Carapelli et al. | |
| 2020/0150264 A1 | 5/2020 | Barson et al. | |
| 2020/0258358 A1 | 8/2020 | Beck et al. | |
| 2021/0149823 A1* | 5/2021 | Palmer | G06F 21/72 |
| 2021/0152532 A1* | 5/2021 | Reinhold | H04L 9/0643 |
| 2022/0201888 A1* | 6/2022 | Ross | H01R 13/518 |

* cited by examiner

TAMPER AND ZEROIZATION RESPONSE UNIT

CROSS REFERENCE TO RELATED APPLICATIONS

This application claims the benefit of the filing date of the provisional patent application having Ser. No. 63/319,399 filed Mar. 14, 2022, the contents of which is incorporated herein in its entirety by this reference.

FIELD OF THE INVENTION

The present invention relates to data sensitive security appliances and more particularly, systems and methods for sanitizing the same, by erasing data from hardware systems when they are physically threatened, or soon to be threatened. Even more particularly, an embodiment of the system of the present invention relates to a stand-alone system for protecting data on data sensitive security appliances.

BACKGROUND OF THE INVENTION

Data sensitive security appliances are under constant threat of being compromised. Several technologies are in place which are intended to harden the security of these appliances. Common technologies include chassis intrusion features, tamper-seals, and tamper-resistant hardware. Using management features in the compute platform, the system can log an intrusion event when detected. Remote data destruction commands can be sent to the system, however often this does not provide value unless pre-existing knowledge of an intrusion is available. Furthermore, should a system be removed from a secured facility and then dissected, there is generally no viable method of data protection.

While data sanitization systems and methods have been successfully accomplished in various ways, in demanding applications and environments it has been increasingly an area of concern.

Consequently, there exists a need for improved methods and systems for sanitizing data in a data sensitive security appliances in the absence of data connectivity or power to the data sensitive security appliance.

SUMMARY OF THE INVENTION

It is an object of the present invention to provide a system and method for sanitizing data in an efficient manner.

It is a feature of the present invention to not require the data sensitive security appliance to be powered on during sanitization.

It is an advantage of the present invention to reduce occasions of failures to properly sanitize data on data sensitive security appliances that have been removed from a secured facility.

It is another feature of the present invention to not require the ability to communicate remotely with the data sensitive security appliance.

It is another feature of the present invention to sanitize data without requiring human intervention.

It is another advantage of the present invention to provide data sanitization benefits with a system and method that may be able to guarantee data isolation for a data sensitive security appliance which has a first portion with a first security classification and second portion which has a different security classification level.

The present invention is an apparatus and method for sanitizing data so as to satisfy the aforementioned needs, provide the previously stated objects, include the above-listed features, and achieve the already articulated advantages. The present invention is carried out in a "remote communication-less" manner and a "power-less" manner in a sense that the failure to sanitize associated with a lack of a functioning communication with and/or power from, a secured facility have been eliminated.

Accordingly, the present invention is a system with reduced risk of unauthorized access to data in a data sensitive security appliance, the system comprising: an electronic apparatus with: a data storage device; a processor; a direct current power source; wherein said direct current power source is electrically coupled to and provides power to both said processor and said data storage device; a stand-alone tamper and zeroization response unit, coupled with said i data storage device via a link which provides both power and a signal to the data storage device for the purpose of sanitizing said data storage device; and said link; never provides power to said processor, and is capable of providing power to said data storage device irrespective of the operational state of said direct current power source.

Accordingly, the present invention is a method of sanitizing an electronic apparatus comprising the steps of: providing a tamper and zeroization response unit; electrically linking said tamper and zeroization response unit to an electronic apparatus having therein: an internal data storage device, a microprocessor, and a direct current power source; providing a signal and power to said internal data storage device, via a link extending between said electronic apparatus and said tamper and zeroization response unit; for the purpose of reducing unauthorized access to data stored on said internal data storage device; and said direct current power source is electrically coupled to and provides power to both said microprocessor and said internal data storage device.

BRIEF DESCRIPTION OF THE DRAWINGS

The invention may be more fully understood by reading the following description of the preferred embodiments of the invention, in conjunction with the appended drawing wherein.

DETAILED DESCRIPTION

Throughout this description details are given of a multi-purpose system, it should be understood that different data sensitive systems, such as industrial, military, financial etc. could use the present invention. It is intended that these specific details not limit the scope of the present invention, unless repeated in the claims, but instead fully enable a specific and/or best mode of the invention and other variations of this system and method are intended to be readily understood from the following description and included within the scope and spirit of the present invention.

Figure 1:
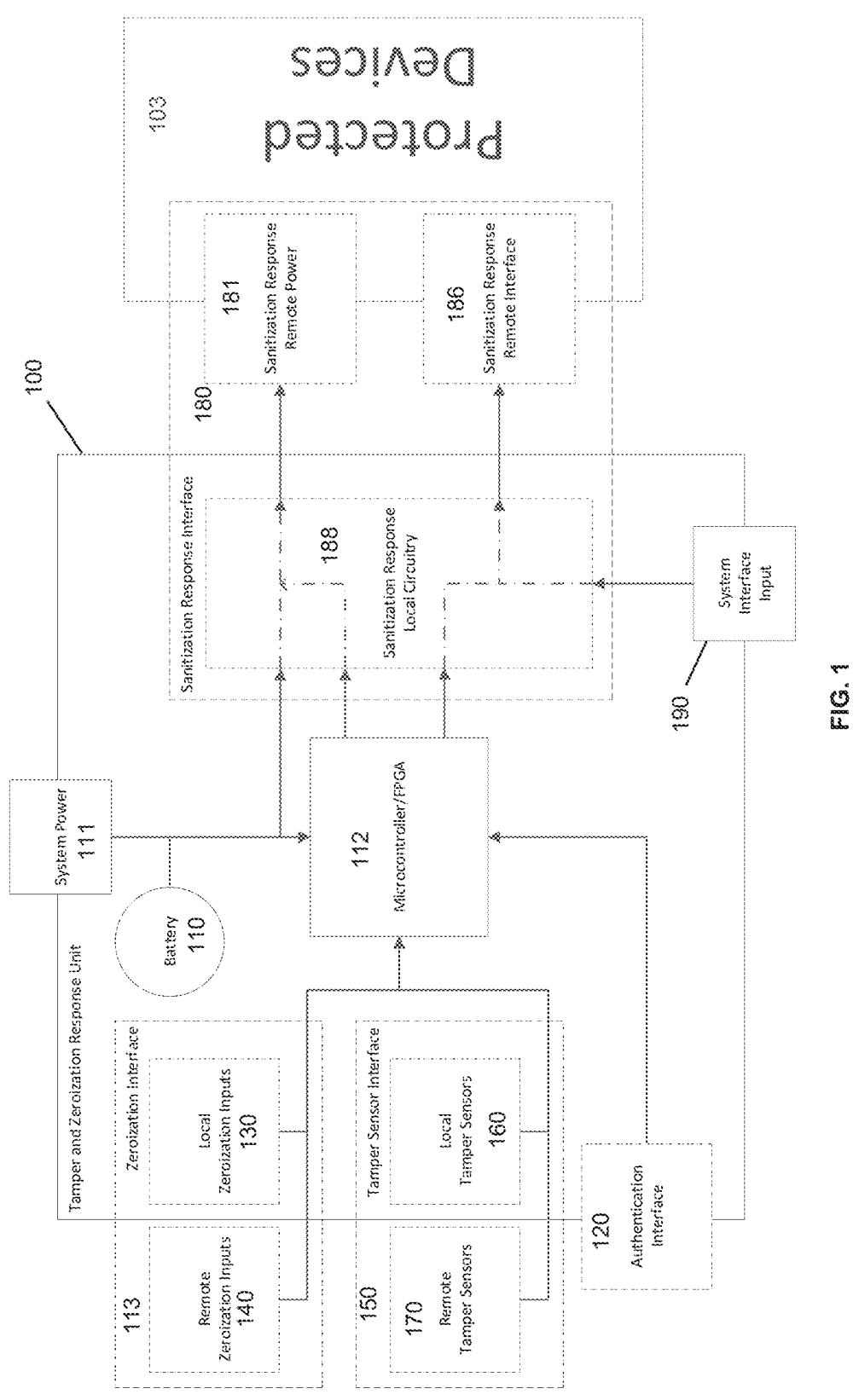
FIG. 1 is a block diagram view of an embodiment of stand-alone tamper and zeroization response unit of the present invention.

Now referring to the FIG. 1, there is shown inside the solid line a stand-alone tamper and zeroization response unit 100, which includes a system power 111, battery 110, microcontroller/FPGA 112 which acts as the central processor for the device 100. The term "stand-alone tamper and zeroization response unit" shall hereafter be defined to be a data sanitization implement that necessarily includes: the ability to detect tampering and automatically command a data sanitization; the ability to allow a human to command data zeroization; a battery therein for providing power to a data storage device for the purpose of zeroizing data therein when no power is being otherwise provided to the data storage device.

The authentication interface 120 performs the function of providing a secure way to preemptively disarm an automatic sanitization response if that might have otherwise occurred while an authorized user is interacting with the system of the present invention and/or the protected devices 103. Authentication interface 120 could include a cryptographic authentication token, smart card/reader combination, keypad, combination lock, or other suitable access security system.

The local zeroization inputs 130 performs the function of providing a user with the ability to command wiping of protected data. These may be buttons, knobs, or other suitable human interfaces.

The remote zeroization interface 140 performs the same function as the local zeroization inputs 130 except that it may be located remotely from the tamper and zeroization response unit 100.

The tamper sensor interface 150 performs the function of accepting input from sensors connected to tamper and zeroization response unit 100.

The local tamper sensors 160 internally perform the functions of generating indicia of potential tampering and providing the same to microcontroller/FPGA 112.

The remote tamper sensors 170 perform similar functions as the local tamper sensors 160 except that they may be located remotely from the tamper and zeroization response unit 100.

Figure 3:
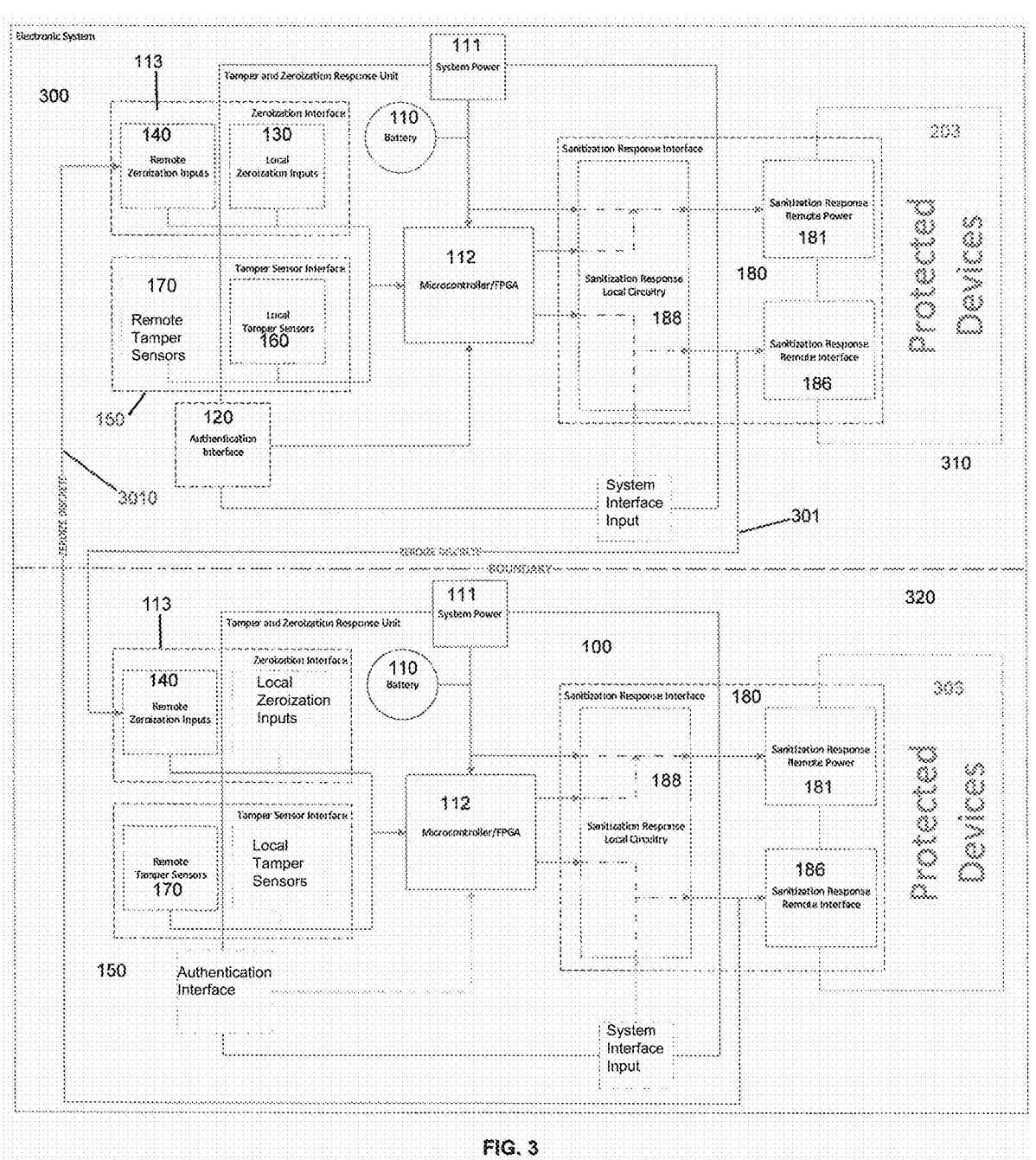
FIG. 3 is block diagram of a representative integration of a data sensitive security appliance of the type having two distinct data classification portions therein, where the integration utilizes tamper and zeroization response units of FIGS. 1 and 2 for each of the distinct data classification portions.

The sanitation response local circuitry 188 can perform power related functions, for example, controlling power supplied to volatile memory devices in the locations of lower classification protected devices 203 and higher classification protected devices 303 (FIG. 3) to sanitize data, in cases of a tamper event or a zeroization command. Similarly, the sanitation response local circuitry 188 could provision power to the protected devices 103, lower classification protected devices 203 and higher classification protected devices 303 if power were needed to e.g. sanitize a solid state drive.

Figure 2:
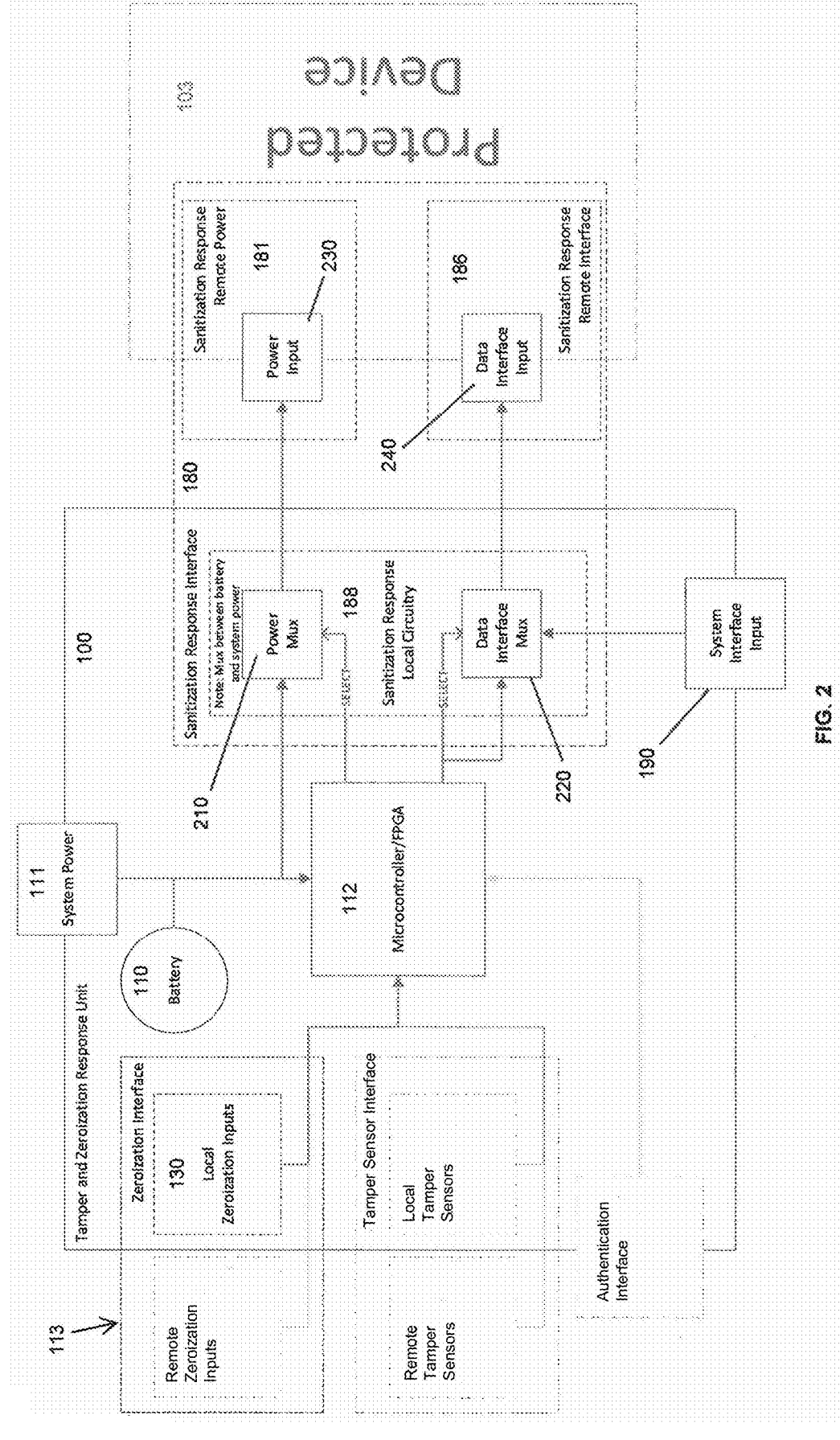
FIG. 2 is a block diagram of a representative integration of the device of FIG. 1 with an example configuration of the battery powered sanitize feature. The general architecture of FIG. 1 is maintained but portions not used in the battery powered sanitizes function have been faded out to highlight the portions that are related to battery operation.

Now referring to FIG. 2, there is shown the tamper and zeroization response unit 100 with details showing the battery powered sanitize feature of the present invention, portions of the tamper and zeroization response unit 100 from FIG. 1 are included but faded so as to highlight the portions involved with this feature. Also shown is power mux 210, power input 230, data interface mux 220, data interface input 240. Each mux, 210 and 220, are controlled by a select line from the microcontroller/FPGA 112. In the case of the power mux 210, the selection is between battery 110 and system power 111. In the case of data interface mux 220, the selection will depend upon the type of data storage devices in the protected devices 103.

In some applications, the protected devices 103 could be divided into discrete portions where each has a different security classification. In such cases, two tamper and zeroization response units 100 could be utilized with one for each classification portion. Now referring to FIG. 3, there is shown an embodiment of the present invention with a multiple classification electronic system 300 which includes a lower classification portion 310 and a higher classification portion 320.

Each of these portions includes identical tamper and zeroization response units 100 if each data interface mux 220 has a common set of compatible storage device types. However, if the types of the data storage devices in the lower classification protected devices 203 and the higher classification protected devices 303 are different and each mux and the sanitation response local circuitry 188 is tailored to the respective storage device types then the tamper and zeroization response units 100 will be nearly identical. The only communication between device lower classification portion 310 and higher classification portion 320 are the multiple classification spanning zeroize discrete signal 301 and 3010 which run from sanitization response interface 180 to the remote zeroization inputs 140 of the other device In the embodiment of FIG. 3, a tampering which affects any portion will result in wiping of all portions.

Figure 4:
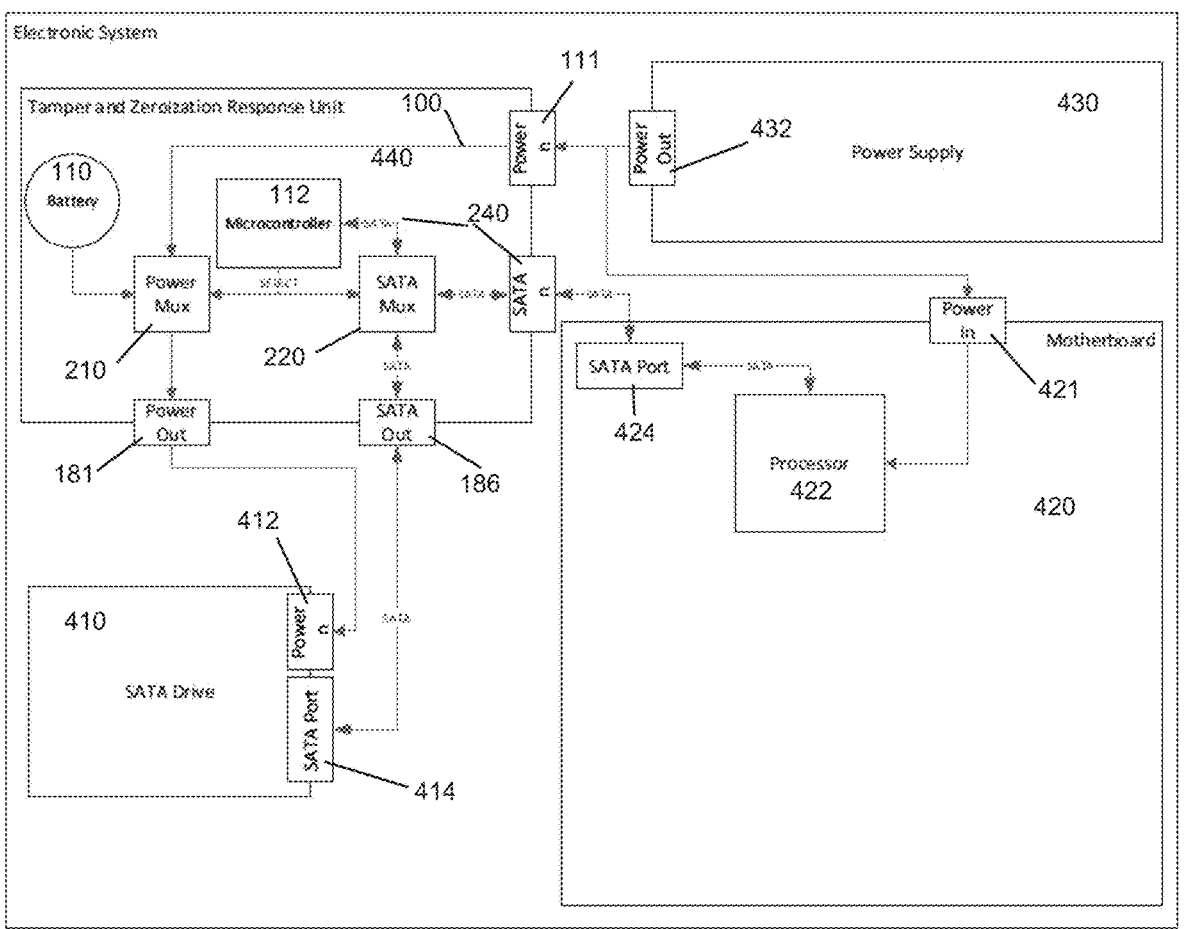
FIG. 4 is a block diagrams of the system of the present invention which shows the tamper and zeroization response unit and peripheral structure in the environment of a computing systems where sanitization of drives can be critical.

Now referring to FIG. 4, there is shown a simplified system level configuration that provides an example of how a system with a protected SATA drive would be configured. The Tamper and Zeroization device has a system power port, (111 in other figures), a SATA input port (part of 190), a SATA output port (part of 186), and a power output port (181).

The SATA input and output would operate as a passthrough interface under normal operation. When a tamper event or zeroization command occurs, the microcontroller is able to select its own SATA bus using the SATA Mux, and communicate with the SATA Drive.

The Power In and Power Out ports operate as a passthrough under normal operation. When a tamper event or zeroization command occurs and the power supply is operational, the microcontroller will use the supplied power to execute the sanitization procedures for the SATA Drive. When a tamper event or zeroization command occurs and the power supply is not operational, the microcontroller will supply power to the SATA drive by selecting the battery power using the Power Mux in order to execute the sanitization procedures for the SATA Drive.

Power from the tamper and zeroization response unit is exclusively supplied to the SATA Drive.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

We claim:
1. A system with reduced risk of unauthorized access to data in an electronic system, the electronic system comprising:
    an electronic apparatus with:
        a data storage device;

a processor;

a direct current power source;

wherein said direct current power source is electrically coupled to and provides power to both said processor and said data storage device;

a stand-alone tamper and zeroization response unit, wherein said stand-alone tamper and zeroization response unit is a data sanitization implement includes: (i) circuitry to detect tampering and automatically command a data sanitization, (ii) circuitry to allow a human to command data zeroization, and (iii) a battery therein for providing power to a data storage device for the purpose of zeroizing data therein when no power is being otherwise provided to the data storage device, coupled with said data storage device via a link which provides both power and a signal, to the data storage device for the purpose of sanitizing said data storage device; and said link; never provides power to said processor, and is used to provide power to said data storage device irrespective of the operational state of said direct current power source.

2. The system of claim 1 wherein said stand-alone tamper and zeroization response unit only provides power to said data storage device.

3. The system of claim 2 wherein said stand-alone tamper and zeroization response unit receives data from said data storage device, when said direct current power source is not operational only during sanitization responses.

4. The system of claim 3 wherein said stand-alone tamper and zeroization response unit has a battery therein, and said stand-alone tamper and zeroization response unit is configured so that said battery will be utilized exclusively for tamper detection, users zeroization commands and subsequent execution of sanitization procedures.

5. The system of claim 4, wherein the stand-alone tamper and zeroization response unit utilizes a discrete signal to exercise circuitry as part of a sanitization response which results in loss of power to volatile storage components, wiping stored data and/or encryption keys.

6. The system of claim 1, wherein the stand-alone tamper and zeroization response unit utilizes a discrete signal to exercise circuitry connected to said electronic apparatus as part of the sanitization response which results in said electronic apparatus executing a pre-existing internal sanitization procedure.

7. The system of claim 1, wherein the stand-alone tamper and zeroization response unit, issues software interface commands to said data storage device as part of a sanitization response which results in wiping of data and/or encryption keys stored on said data storage device.

8. The system of claim 1, where the stand-alone tamper and zeroization response unit allows a zeroization command to be issued through local or remote inputs.

9. The system of claim 8 where the stand-alone tamper and zeroization response unit is configured so as to execute a sanitization response automatically when a tamper event occurs, or zeroization is commanded manually.

10. The system of claim 9 where the stand-alone tamper and zeroization response unit is configured so as to utilize a battery to enable tamper detection, zeroization command, and sanitization response without an external power source.

11. A method of sanitizing an electronic apparatus comprising the steps of:

providing a stand-alone tamper and zeroization response unit, wherein said stand-alone tamper and zeroization response unit is a data sanitization implement that includes: (i) circuitry to detect tampering and automatically command a data sanitization, (ii) circuitry to allow a human to command data zeroization, and (iii) a battery therein for providing power to a data storage device for the purpose of zeroizing data therein when no power is being otherwise provided to the data storage device;

electrically linking said stand-alone tamper and zeroization response unit to an electronic apparatus having therein:

an internal data storage device, a microprocessor, and a direct current power source:

providing a signal and power to said internal data storage device, via a link extending between said electronic apparatus and said stand-alone tamper and zeroization response unit; for the purpose of reducing unauthorized access to data stored on said internal data storage device;

wherein said link never provides power to said microprocessor; and said direct current power source is electrically coupled to and provides power to both said microprocessor and said internal data storage device.

12. The method of claim 11, wherein said stand-alone tamper and zeroization response unit never receives power from said direct current power source.

13. The method of claim 12, wherein said stand-alone tamper and zeroization response unit never receives data from said internal data storage device, during normal operation.

14. The method of claim 13, wherein said stand-alone tamper and zeroization response unit has a battery therein that is sized, configured, and located so as to be utilized for tamper detection and subsequent creation and issuance of zeroization causing signals, during times when no external sources of power are being provided to said stand-alone tamper and zeroization response unit.

15. The method of claim 14, wherein the stand-alone tamper and zeroization response unit utilizes a discrete signal to exercise circuitry as part of a sanitization response which results in loss of power to volatile storage components, wiping stored data and/or encryption keys.

16. The method of claim 11, wherein the stand-alone tamper and zeroization response unit utilizes a discrete signal to exercise circuitry connected to said electronic apparatus as part of the sanitization response which results in said electronic apparatus executing a pre-existing internal sanitization procedure.

17. The method of claim 11, wherein the stand-alone tamper and zeroization response unit, issues software interface commands to said internal data storage device as part of a sanitization response which results in wiping of data and/or encryption keys stored on said internal data storage device.

18. The method of claim 11, where the stand-alone tamper and zeroization response unit allows a zeroization command to be issued through local or remote inputs.

19. The method of claim 11, where the stand-alone tamper and zeroization response unit is configured so as to execute a sanitization response automatically when a tamper event occurs, or zeroization is commanded manually.

20. A method of sanitizing a data storage device comprising the steps of:

providing a stand-alone tamper and zeroization response unit;

wherein said stand-alone tamper and zeroization response unit is a data sanitization implement that includes: (i) circuitry to detect tampering and automatically command a data sanitization, (ii) circuitry to allow a human to command data zeroization, and (iii) a battery therein for providing power to a data storage device for the purpose of zeroizing data therein when no power is being otherwise provided to the data storage device;

monitoring sensors for tamper events, monitoring zeroization inputs, and initiating sanitization procedures in response thereto, and where said steps of monitoring sensors for tamper events, monitoring zeroization inputs and initiation of sanitization procedures can be performed from battery power which is never used for any purpose other than said steps of monitoring sensors for tamper events, monitor zeroization inputs and sanitization procedures.

* * * * *